Figure 1:
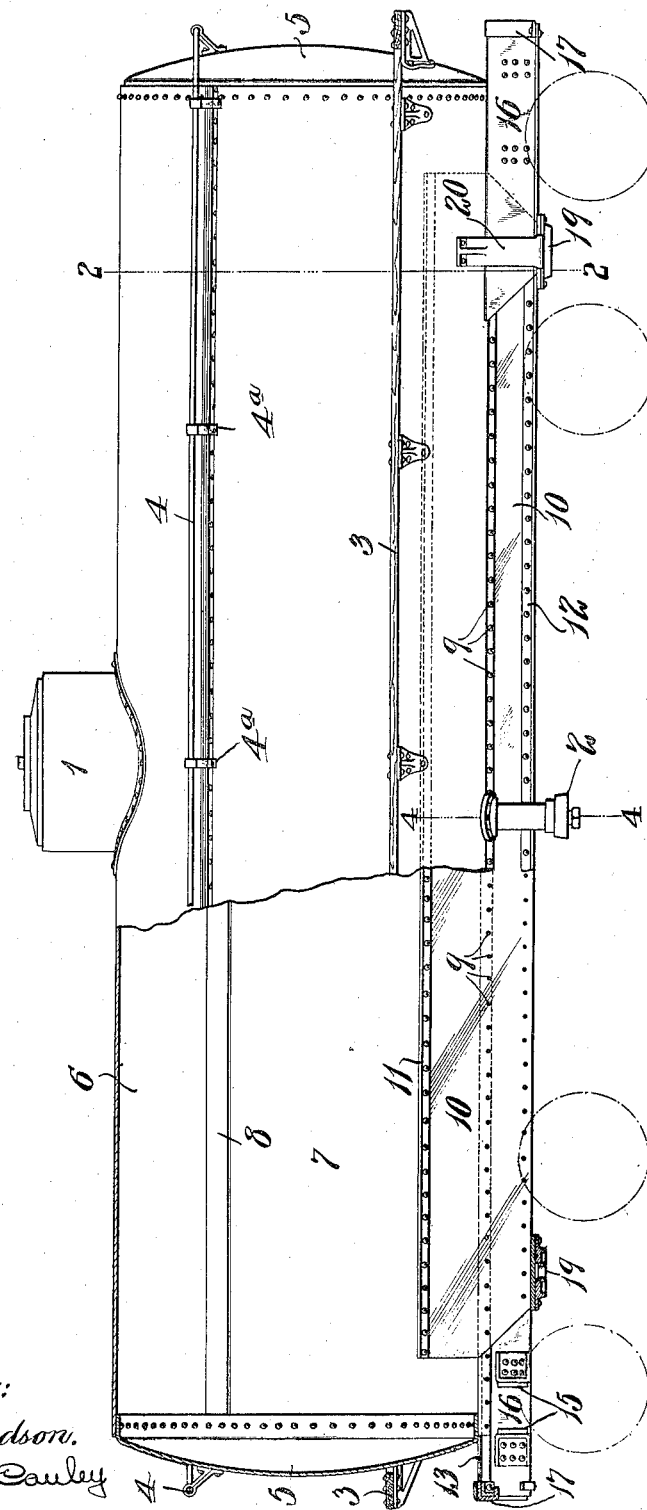

No. 845,752. PATENTED MAR. 5, 1907.
T. R. BROWN.
TANK CAR.
APPLICATION FILED DEC. 1, 1906.

3 SHEETS—SHEET 1.

Witnesses:
Geo. R. Ladson.
A. J. McCauley

Inventor:
Thomas R. Brown.
By
Bakewell Cornwall
Attys.

No. 845,752. PATENTED MAR. 5, 1907.
T. R. BROWN.
TANK CAR.
APPLICATION FILED DEC. 1, 1906.
3 SHEETS—SHEET 2.
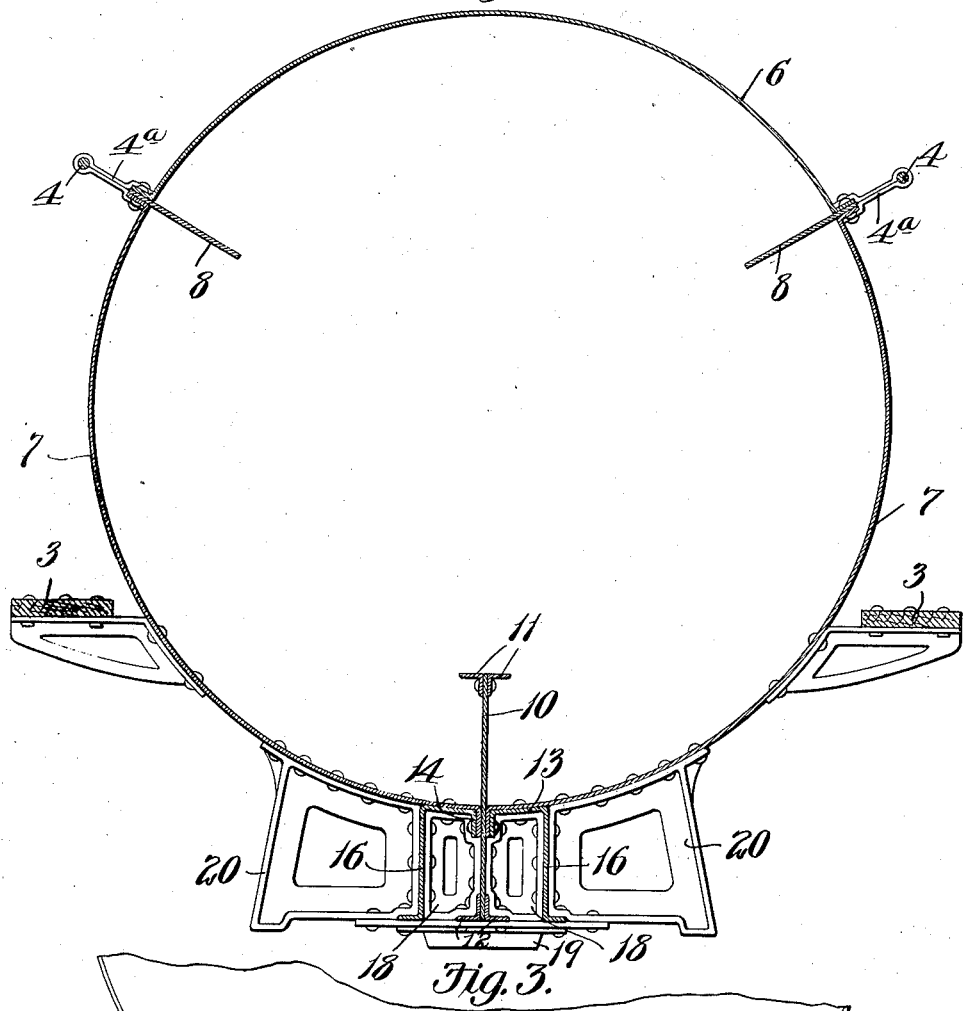
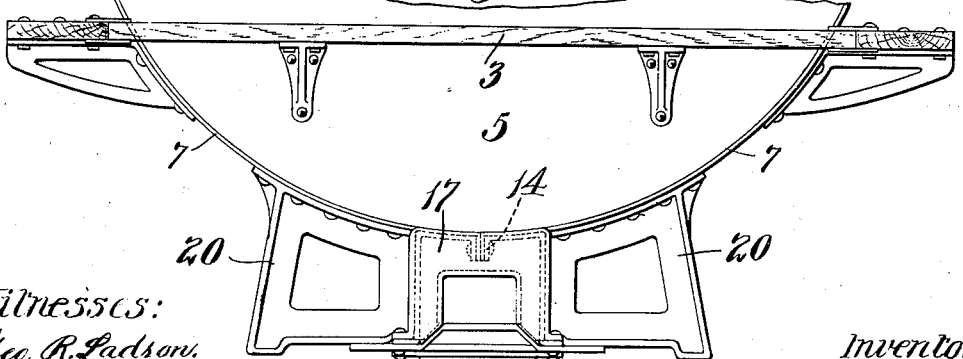
Witnesses:
Geo. R. Jadson.
A. J. McCauley.
Inventor,
Thomas R. Brown.
By Bakewell Cornwall Attys.

No. 845,752.  
PATENTED MAR. 5, 1907.  
T. R. BROWN.  
TANK CAR.  
APPLICATION FILED DEC. 1, 1906.
3 SHEETS—SHEET 3.
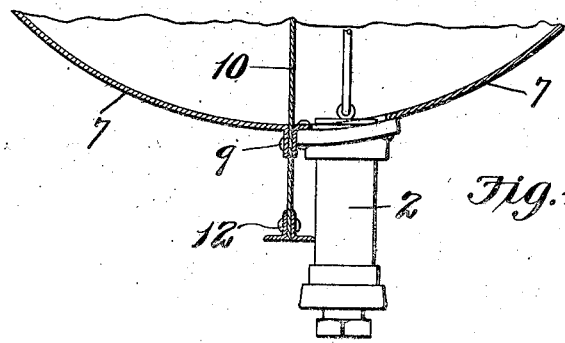
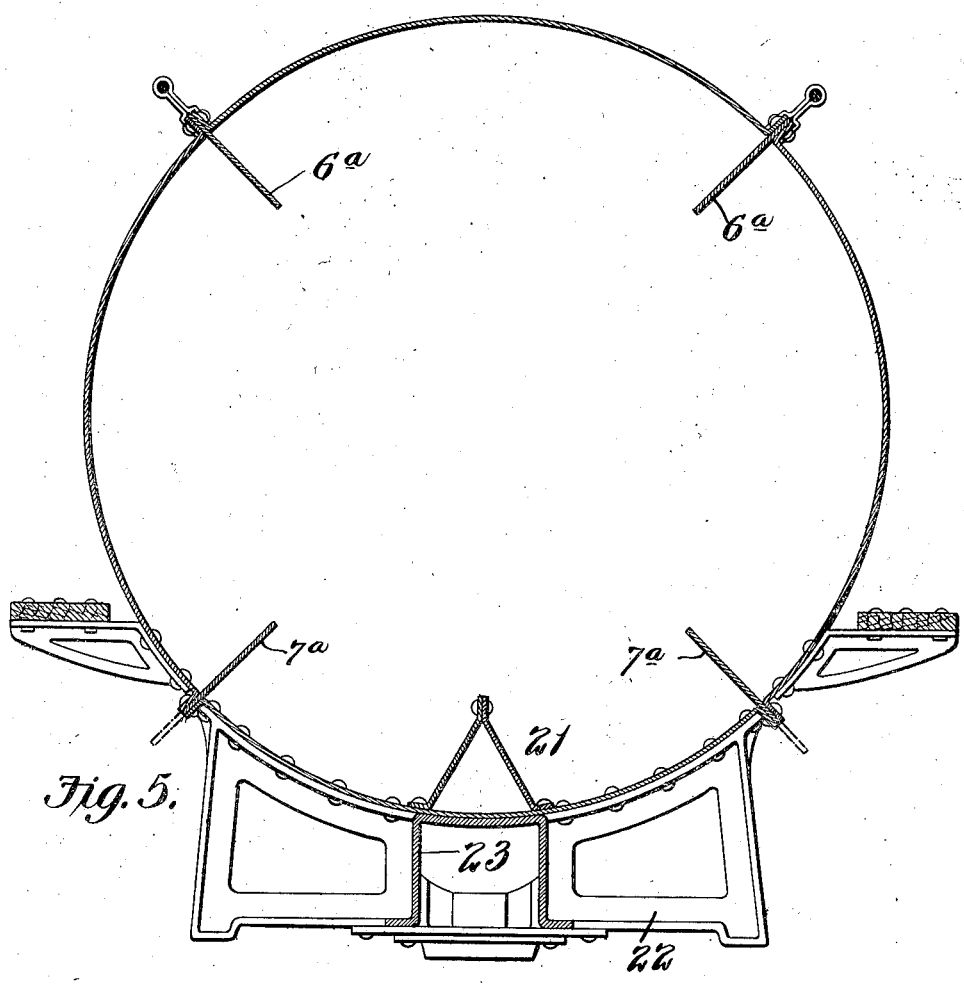
Witnesses:  
Geo. R. Ladson.  
A. J. McCauley
Inventor,  
Thomas R. Brown.  
By Bakewell & Cornwall  
Attys.

UNITED STATES PATENT OFFICE.

THOMAS R. BROWN, OF NEW YORK, N. Y., ASSIGNOR TO AMERICAN CAR & FOUNDRY COMPANY, OF ST. LOUIS, MISSOURI, A CORPORATION OF NEW JERSEY.

TANK-CAR.

No. 845,752.     Specification of Letters Patent.     Patented March 5, 1907.

Application filed December 1, 1906. Serial No. 345,857.

*To all whom it may concern:*

Be it known that I, THOMAS R. BROWN, a citizen of the United States, residing at the city, county, and State of New York, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1 is a side elevational view, partly in vertical section, of a tank-car constructed in accordance with my invention. Fig. 2 is a cross-sectional view taken on the line 2 2 of Fig. 1. Fig. 3 is an end elevational view with the upper portion of the tank broken away. Fig. 4 is a sectional view taken on the line 4 4 of Fig. 1; and Fig. 5 is a view similar to Fig. 2, illustrating a modified form.

This invention relates to new and useful improvements in tank-cars, the object being to provide a car possessing maximum strength and minimum weight. In a tank-car the weight of the tank and its contents act as a load which tends to place the bottom of the tank structure in tension and the top of said structure in compression. In accordance with my invention this load is supported by longitudinal braces arranged above the center of the tank and a longitudinal sill secured to the bottom of the tank. The upper portion of this longitudinal sill is located inside of the tank, and its lower portion extends below the tank. The longitudinal sill in addition to reinforcing the tank structure is arranged to receive the buffing and pulling stresses and transmit said stresses from end to end of the car in a straight line.

Referring to the drawings, the tank is provided with a suitable filling-dome 1 and a discharge-valve 2.

3 indicates a running-board, and 4 is a hand-rail supported by brackets 4ª, secured to the longitudinal flanges of the tank. Flanged heads 5 close the ends of the tank. A curved sheet 6 forms the top of the tank, and the side and bottom walls of said tank are also formed by curved sheets 7. The sheets 6 and 7 preferably extend from end to end of the tank and are riveted to the heads 5. The adjacent edges of the sheets 7 and 6 are flanged outwardly, and tank-braces 8 are interposed between and riveted to the flanges. These braces extend beyond said flanges in one or both directions, said braces preferably extending into the tank. The lower edges of the sheets 7 are flanged outwardly, the flanges being arranged on opposite sides of the vertical web of a longitudinal sill. Rivets 9 secure said web and flanges together. The longitudinal sill is preferably I-shaped in cross-section and may be a rolled I-beam or a built-up structure comprising a web plate 10, reinforced by angles 11 and 12 at its longitudinal edges. The upper portion of this sill is preferably arranged inside of the tank, and its lower portion preferably extends below the tank.

Short draft-sills are located under and project beyond the ends of the tank. The top portions 13 of the draft-sills are preferably riveted to the tank and provided with flanges 14, which are riveted to the lower flanges of the tank-sheets 7. Draft-lugs 15, between which any suitable draft-rigging may be applied, are secured to vertical webs 16 of the draft-sills. Buffer-blocks 17 cover the outer ends of the draft-sills, the inner ends of said sills preferably extending through body-bolsters, which are located near the ends of the tank. The body-bolsters are connected by the longitudinal sill, which passes through the center of said bolsters. Each body-bolster contains central filler-blocks 18, which are riveted to the longitudinal sill. These blocks are arranged between said sill and the vertical webs 16 of the draft-sills.

19 indicates center bearings, which are secured to the body-bolsters below the filler-blocks 18.

20 indicates side wings of the bolsters, the upper portions of which are curved and riveted to the tank, the inner faces of said wings being riveted to the filler-blocks 18, the rivets also passing through the vertical webs of the draft-sills.

My invention is not limited to body-bolsters and draft-sills constructed as herein shown and described, as many different designs of bolsters and draft members may be employed in connection with this invention.

Fig. 5 illustrates a tank composed of four longitudinal sheets. Tank-braces 6ª and 7ª extend into the tank and are interposed between the adjacent edges of the longitudinal tank-sheets. If desired, these braces may extend outside of the tank, as shown by dotted lines.

21 indicates an internal sill which is riveted to the bottom tank-sheet.

22 and 23 indicate the body-bolsters and draft-sills, respectively.

The tank shown in Fig. 6 could be used with the ordinary underframe, or by modifying the bottom tank-sheet the longitudinal sill shown in Figs. 1 and 2 could be applied to this tank.

I am aware that minor changes in the construction, arrangement, and combination of the various parts of my device could be made and substituted for those herein shown and described without departing from the nature and principle of my invention.

Having thus described the invention, what is claimed as new, and desired to be secured by Letters Patent, is—

1. In a tank-car, the combination with a tank, of a longitudinal sill in the form of a girder arranged partly within the tank; substantially as described.

2. In a tank-car, the combination with a tank, of a longitudinal sill in the form of a girder arranged partially outside the tank; substantially as described.

3. In a tank-car, the combination with a tank, of a longitudinal sill having compression and tension flanges, the compression-flange being located inside the tank, and the tension-flange being arranged outside said tank; substantially as described.

4. In a tank-car, the combination with a tank, of a longitudinal sill which extends through the bottom of the tank; substantially as described.

5. In a tank-car, a tank, and a longitudinal sill connecting the bolsters beneath the tank, and having its upper edge located within the tank; substantially as described.

6. In a tank-car, tank-sheets flanged at their adjacent edges, and a longitudinal sill interposed between and riveted to said flanges; substantially as described.

7. In a tank-car, tank-sheets flanged at their adjacent edges, and a longitudinal sill comprising a web portion which is interposed between and riveted to said flanges, said sill also having compression and tension flanges; substantially as described.

8. In a tank-car, body-bolsters, tank-sheets flanged outwardly at their adjacent edges, and a longitudinal sill which connects the body-bolsters interposed between and riveted to said flanges; substantially as described.

9. In a tank-car, a tank, and an I-shaped longitudinal sill connecting the bolsters beneath the tank, and having its upper edge located within the tank; substantially as described.

10. In a tank-car, a tank comprising a plurality of curved sheets, the adjacent edges of which are flanged outwardly and secured together, body-bolsters arranged under said tank, a longitudinal sill connecting the body-bolsters, and draft-sills secured to said body-bolsters; substantially as described.

11. A tank-car in which the tank structure is reinforced by a longitudinal tank-brace arranged above the center of the tank, and a longitudinal sill secured to the bottom of the tank; substantially as described.

12. A tank-car, a tank comprising a plurality of tank-sheets which are flanged at their adjacent edges, and tank-braces arranged between and extending beyond said flanges; substantially as described.

13. In a tank-car, a tank comprising a plurality of sheets which extend from end to end of the car, the longitudinal edges of said sheets being flanged outwardly, and tank-braces arranged between and extending beyond said flanges; substantially as described.

14. In a tank-car, a plurality of tank-sheets flanged at their adjacent edges, and tank-braces which extend into the tank arranged between and secured to said flanges; substantially as described.

15. In a tank-car, a tank which is reinforced by one or more longitudinal braces arranged above the center of the tank and secured thereto between the tank-sheets; substantially as described.

16. In a tank-car, a tank which is reinforced by one or more interiorly-arranged braces located above the center of the tank and extending from end to end thereof; substantially as described.

17. In a tank-car, tank-sheets provided with flanges which extend below the tank, and a longitudinal sill secured to said flanges; substantially as described.

18. In a tank-car, tank-sheets provided with flanges which extend below the tank, and a draft-sill secured to said flanges; substantially as described.

19. A tank-car having longitudinal flanges, and supporting-brackets secured to said flanges; substantially as described.

In testimony whereof I hereunto affix my signature, in the presence of two witnesses, this 26th day of November, 1906.

THOMAS R. BROWN.

Witnesses:
ROBT. G. JEFFERY,
EDW. D. HILLMAN.